United States Patent [19]

Okada

[11] Patent Number: 5,400,151
[45] Date of Patent: Mar. 21, 1995

[54] NOISE REDUCTION APPARATUS FOR ELIMINATING PERIODIC NOISE

[75] Inventor: Teruo Okada, Fujioka, Japan

[73] Assignee: Kabushiki Kaisha Toshiba, Kawasaki, Japan

[21] Appl. No.: 40,074

[22] Filed: Mar. 30, 1993

Related U.S. Application Data

[63] Continuation of Ser. No. 650,622, Feb. 5, 1991, abandoned.

[30] Foreign Application Priority Data

Feb. 6, 1990 [JP] Japan .................. 2-25107

[51] Int. Cl.⁶ .................................. H04N 5/213
[52] U.S. Cl. ................................ 358/340; 348/607
[58] Field of Search .............. 358/340, 337, 335, 36, 358/167; 381/94; 348/607; 360/33.1

[56] References Cited

U.S. PATENT DOCUMENTS

| | | | |
|---|---|---|---|
| 4,042,959 | 8/1977 | Klein | 358/167 |
| 4,058,836 | 11/1977 | Drewery et al. | 358/167 |
| 4,163,253 | 7/1978 | Morio et al. | 358/340 |
| 4,637,050 | 1/1987 | Schradin | 381/94 |
| 4,677,487 | 6/1987 | Tomita et al. | |
| 4,682,251 | 7/1987 | Hino et al. | 358/33.1 |
| 4,807,034 | 2/1990 | Takeuchi et al. | 358/340 |
| 4,841,366 | 6/1989 | Katagiri et al. | 358/167 |
| 4,961,113 | 10/1990 | Okada et al. | 358/167 |

FOREIGN PATENT DOCUMENTS

3400103  7/1985  Germany .
60-16028  1/1985  Japan .

*Primary Examiner*—Tommy P. Chin
*Assistant Examiner*—Huy Nguyen
*Attorney, Agent, or Firm*—Banner, Birch, McKie & Beckett

[57] ABSTRACT

When a first videotape as a reference is reproduced by a rotary head, the periodic noise output by the signal-processing section is extracted by the extracting means and stored in the memory section according to the reproduction timing. Then, when a second videotape on which a desired video signal has been recorded is reproduced, an electric signal reproduced from the second videotape by the rotary head is processed by the signal processing section, from the output of which, the periodic noise stored in the memory-section is then subtracted. As a result of this, the periodic noise is removed from the video signal reproduced for the second videotape.

7 Claims, 5 Drawing Sheets

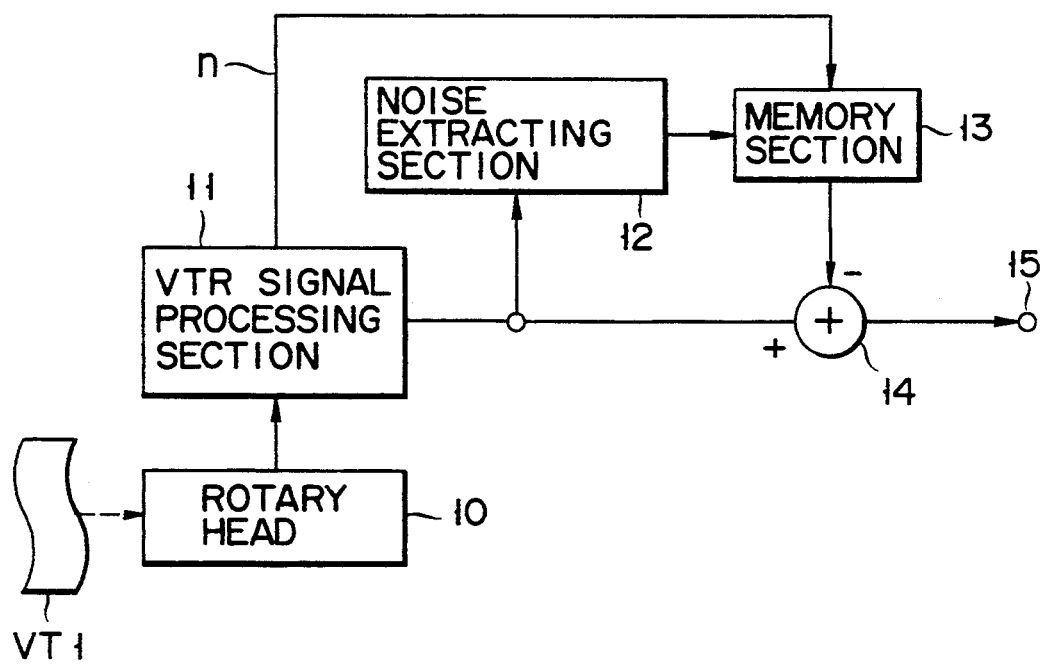
F I G. 1
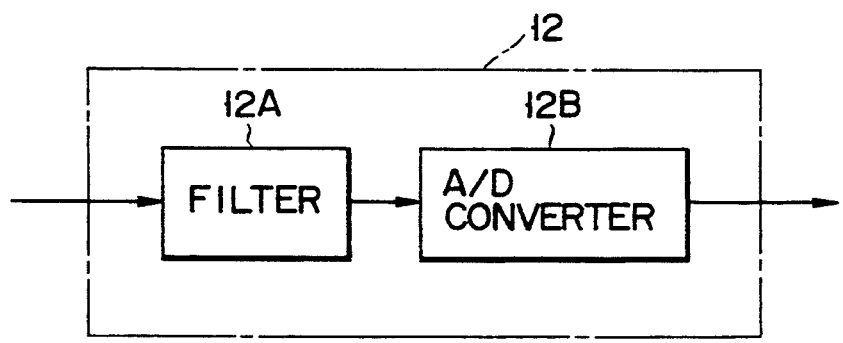
F I G. 2

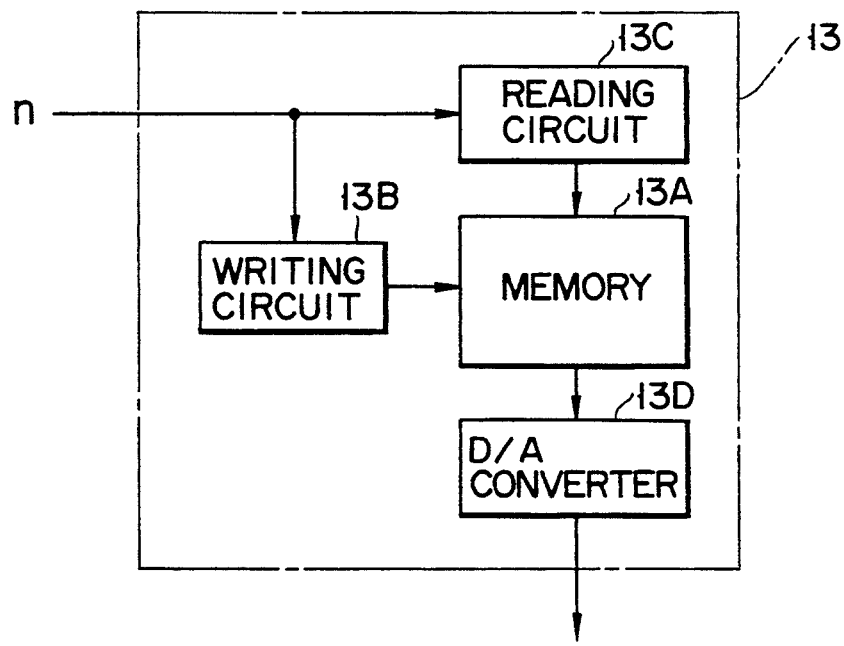
F I G. 3
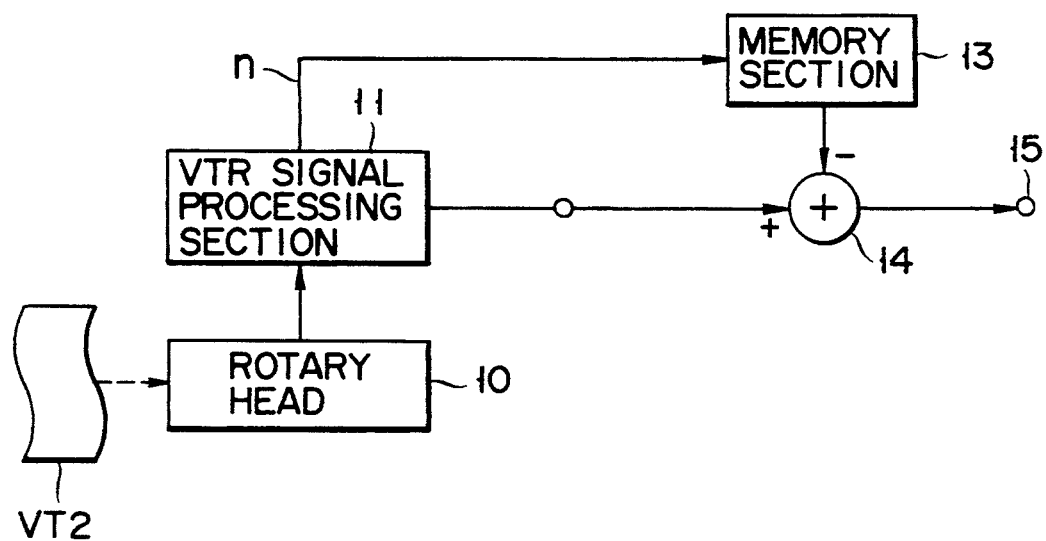
F I G. 4

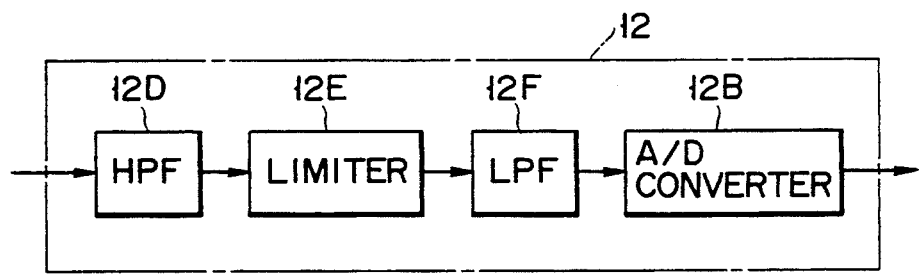
F I G. 7
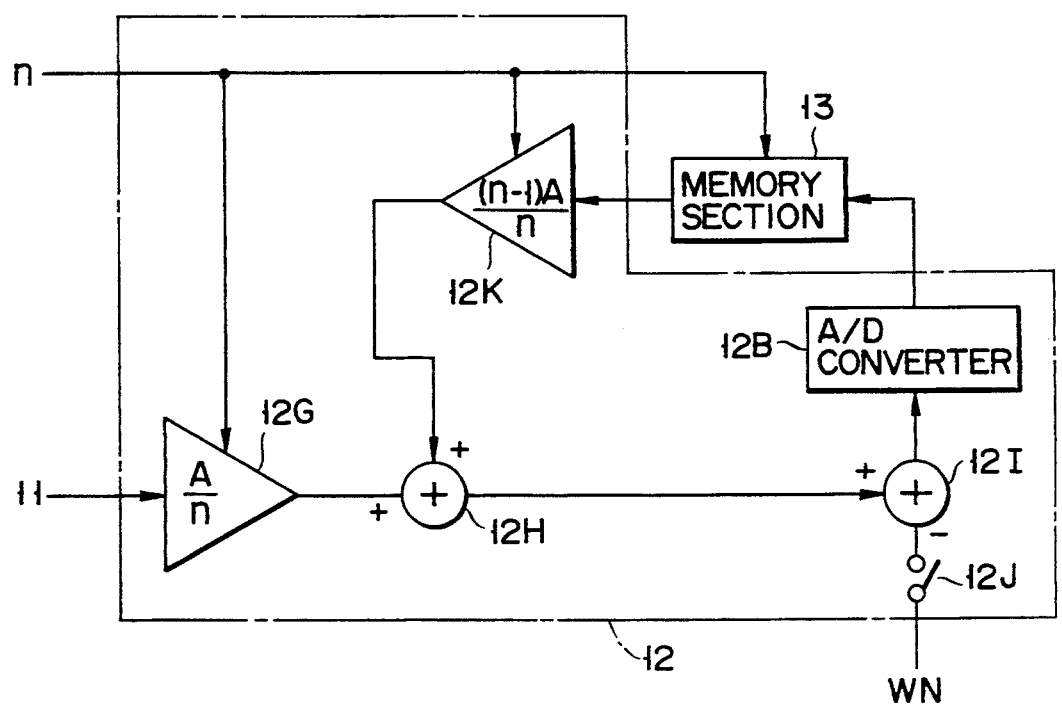
F I G. 8

NOISE REDUCTION APPARATUS FOR ELIMINATING PERIODIC NOISE

This application is a continuation of application Ser. No. 07/650,622, filed Feb. 5, 1991, abandoned.

BACKGROUND OF THE INVENTION

1. Field of the Invention

This invention relates to a noise reduction apparatus for eliminating periodic noise in videotape recorders or the like.

2. Description of the Related Art

In videotape recorder devices (hereinafter abbreviated as VTR devices), for example, the rotary head and related components can develop periodic noises. These periodic noises include fluctuations in the chrominance signal phase or changes in the luminance signal level. Such periodic noises can cause a particular portion of the screen to vary in color or brightness over a specific range. These phenomena have not been generally considered a result of noises, but, in most cases, of the signal themselves.

The VTR device is provided with various noise reduction devices for noise removal. However, those noise reduction devices are for removing random noises rather than periodic noises.

SUMMARY OF THE INVENTION

The object of the present invention is to provide a noise reduction apparatus that ensures a removal of periodic noises.

The object is accomplished by the invention which comprises: extracting means for extracting periodic noise from signal output means that outputs a signal containing periodic noise; memory means for storing the extracted noise; and subtracting means for subtracting the noise read from the memory means from the signal output by the signal output means in synchronization with the latter signal.

In this invention, when a first videotape as a reference is reproduced by the converting means that converts a magnetic signal into an electric signal, the periodic noise output from the signal processing means is extracted by the extracting means to store it in the memory means. Later, when a second videotape on which a desired video signal is recorded is reproduced, the electric signal output by the converting means and supplied from the second videotape is processed by the signal processing means. Then, the periodic noise stored in the memory means is subtracted from the signal output from the signal processing means. As a result of this, the periodic noise is positively removed from the video signal reproduced from the second videotape.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a block diagram of a first embodiment of the present invention, illustrating an arrangement for extracting noise;

FIG. 2 is a block diagram of a first embodiment of the noise extracting section of FIG. 1;

FIG. 3 is a block diagram for the memory section 13 of FIG. 1;

FIG. 4 is a block diagram of the first embodiment of the present invention, showing a configuration for eliminating noise;

FIG. 7 is a block diagram for a third embodiment of the noise extracting section 12;

FIG. 8 is a block diagram for a fourth embodiment of the noise extracting section 12;

DETAILED DESCRIPTION OF THE PREFERRED EMBODIMENTS

Figure 5:
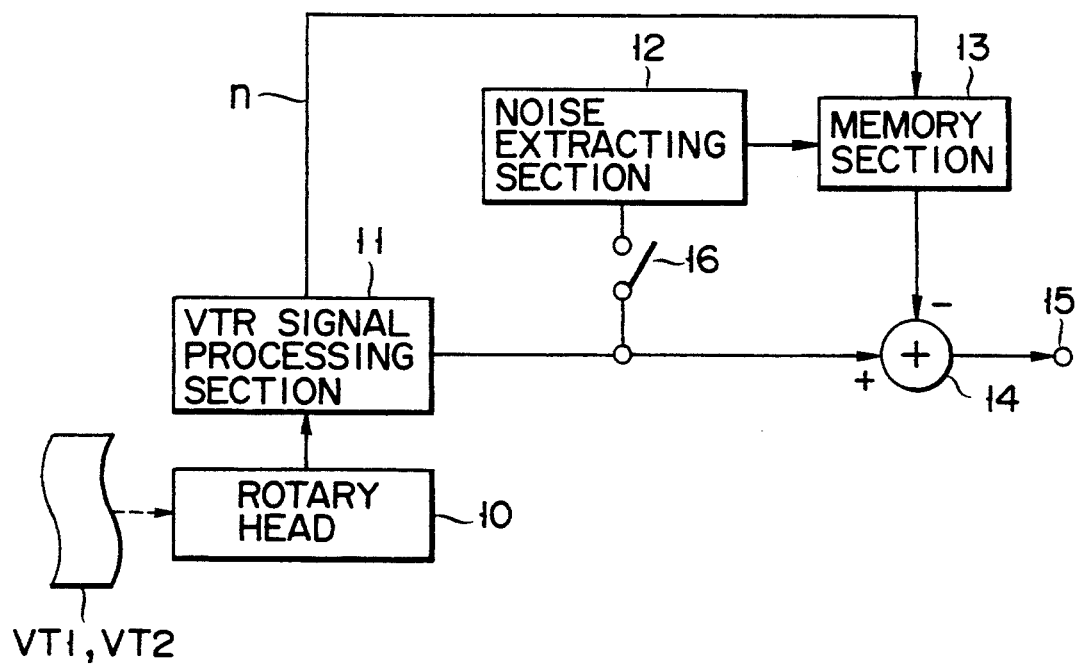
FIG. 5 is a block diagram of a second embodiment according to the present invention.

An embodiment of the present invention will be explained, referring to the accompanying drawings.

FIG. 1 illustrates the application of the present invention to a VTR device.

A video signal, as magnetic information, recorded on to a videotape VT1 is converted by a rotary head 10 into an electric signal, which is then supplied to a VTR signal processing section 11. The VTR signal processing section 11, whose construction is known, reproduces a video signal from the frequency-modulated luminance and chrominance signals supplied from the rotary head 10. The video signal output by the VTR signal processing section 11 is supplied to a noise extracting section 12.

FIG. 2 shows a first embodiment of the noise extracting section 12, which is composed of, for example, a filter 12A and an analog to digital (A/D) converter 12B. The filter 12A is set according to the frequency band of the noise to be removed and may be made up of a low-pass filter or a high-pass filter. The noise extracting section 12 extracts the periodic noise with a period of one frame or field, via the filter 12A, from the signal reproduced by the VTR signal processing section 11, and the extracted signal is converted into a digital signal by the A/D converter 12B. The noise extracted by the noise extracting section 12 is supplied to the memory section 13.

FIG. 3 shows the arrangement of the memory section 13, which is composed of, for example, a memory 13A made up of a DRAM (Dynamic Random Access Memory), a writing circuit 13B, a reading circuit 13C, and a digital to analog (D/A) converter 13D. The memory 13A has, for example, one field of memory capacity. The writing circuit 13B writes the extracted noise into the memory 13A in synchronization with the reproduction timing of the VTR signal processing section 11 such as the rotational period of the rotary drum, or with the timing signal n for one field. The reading circuit 13C reads the stored signal from the memory 13A in synchronization with the timing signal n. The D/A converter 13D converts the noise signal read from the memory 13A into an analog signal. Both the noise signal from the D/A converter 13D and the video signal from the VTR signal processing section 11 are supplied to a subtracting circuit 14. The subtracting circuit 14 eliminates periodic noise from the video signal by, during VTR reproduction, subtracting the noise signal output by the D/A converter 13D, from the VTR signal processing section 11. The resulting noise-free video signal is output from the output terminal 15.

It is not necessary for the noise extracting section 12 to extract noise constantly. For example, it may be done in inspection work during the manufacture of VTR devices. In this case, the noise extracting section 12 is connected between the output of the VTR signal processing section 11 and the memory section 13 to store the noise extracted by the noise extracting section 12, into the memory 13A. After the storing of the noise into the memory 13A, the noise extracting section 12 is disconnected from between the output of the VTR signal processing section 11 and the memory section 13.

In extracting periodic noise, for example, a videotape to which no video signal is recorded is used as the videotape VT1. When the rotary head 14 and related devices generate periodic noises, the reproduction of the no-signal videotape by the rotary head 10 and VTR signal processing section 11 results in the reproduced signal containing periodic noise. That is, the reproduced signal includes white noise and periodic noise. The filter 12A in the noise extracting section 12 extracts periodic noise from the reproduced signal over, for example, one field. The extracted noise is converted by the A/D converter 12B into a digital signal, which is then stored into the memory 13A in response to the timing signal n. Thus, in the memory 13A, only the extracted periodic noise is stored at regular intervals in response to the timing signal n.

FIG. 4 shows the way that a videotape VT2, to which a desired video signal is recorded, is reproduced by a VTR device, whose memory 13A has stored periodic noise as mentioned above. In this case, the noise extracting section 12 has been disconnected. When a particular videotape is reproduced by the rotary head 10 and VTR signal processing section 11, the signal output by the VTR signal processing section 11 also contains periodic noise as in the case of reproducing no-signal videotape. Therefore, periodic noise can be removed by reproducing a video signal with the VTR signal processing section 11 and at the same time, reading the noise from the memory section 13 in synchronization with the timing signal n output from the VTR signal processing section 11, and then extracting the noise read from the memory section 13 from the video signal output by the VTR signal processing section 11.

In the embodiment described above, the periodic noise is extracted by the noise extracting section 12 and stored into the memory section 13. The stored noise in the memory section 13 is read out in synchronization with the VTR signal output by signal processing section 11, and is extracted from the reproduced signal. This assures elimination of the periodic noise.

Although removal of periodic noises usually requires investigating their causes and based on the result, taking measures, the embodiment allows removal of periodic noises irrespective of the cause of noises, which provides greater flexibility in applications.

While in the aforementioned embodiment one field of signal is extracted from the signal reproduced by the VTR signal processing section 11, by the noise extracting section 12, the amount to be extracted is not limited to one field and may be one frame, depending on the period of noise.

In addition, if the VTR signal processing section 11 converts the reproduced signal into a digital signal, this will make it unnecessary to use the A/D converter 12B in the noise extracting section 12 and the D/A converter 13D that converts the noise read from the memory 13A into an analog signal.

Furthermore, while in the foregoing embodiment, the noise extracting section 12 is connected to the output of the VTR signal processing section 11 to extract periodic noise from a video signal, the noise may be extracted from the frequency-modulated signal output from the rotary head 10 to remove the noise at the stage where the signal is frequency-modulated.

A second embodiment of the present invention will now be explained, referring to FIG. 5. Although in the first embodiment, the VTR device does not have the noise extracting section 12, which is connected to it only when noise is extracted, it may contain the noise extracting section 12. In FIG. 5, the noise extracting section 12 is connected via the switch 16 to the output of the VTR signal processing section 11. With this arrangement, when a no-signal videotape is reproduced with the switch 16 on, noise is extracted by the noise extracting section 12 and written into the memory section 13. In reproducing a video-signal-recorded videotape, the stored noise is read from the memory section 13 in response to the timing signal n and subtracted from signal output by the VTR signal processing section 11, thereby eliminating periodic noises from the reproduced signal.

In this embodiment, making the switch 16 on refreshes the noise stored in the memory section 13, which ensures removal of periodic noise regardless of changes in noise-generating condition.

The switch 16 may be changed manually or automatically at, for example, regular intervals in the VTR device.

Other embodiments of the noise extracting section 12 will be explained. The same parts as in FIGS. 1 through 3 are indicated by the same symbols.

Figure 6:
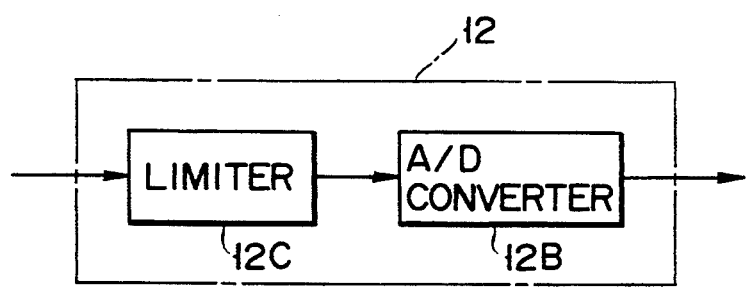
FIG. 6 is a block diagram for a second embodiment of the noise extracting section 12.

FIG. 6 illustrates a second embodiment of the noise extracting section 12. In this embodiment, the output of the VTR signal processing section 11 (not shown) is connected to the input of the limiter 12C, the output of which is connected to the A/D converter 12B. The limiter 12C is capable of changing the limit level. The adjustment of the level allows only the desired noise to be extracted.

FIG. 7 shows a third embodiment of the noise extracting section 12 which is a combination of a filter and a limiter. The output of the VTR signal processing section 11 (not shown) is connected to the input of the high-pass filter (HPF) 12D, the output of which is connected to the input of the limiter 12E. The output of the limiter 12E is connected to the input of the low-pass filter (LPF) 12F, the output of which is connected to the A/D converter 12B.

FIG. 8 illustrates a fourth embodiment of the noise extracting section 12. The output of the VTR signal processing section 11 (not shown) is connected to the input of the amplifier 12G, the output of which is connected to one input of the adder 12H. The output of the adder 12H is connected to one input of the adder 12I, the other input of which is connected to the switch 12J, via which the average of white noise WN can be supplied. The output of the adder 12I is connected via the A/D converter 12B to the input of the memory section 13, the output of which is connected to the input of the amplifier 12K, the output of which is connected to the other input of the adder 12H.

Each of these amplifiers 12G and 12K is composed of a variable gain control amplifier. If the output level of a video signal is A (a constant) and the timing signal corresponding to the field number (the number of rotations of the rotary drum) of the video signal is n, the gain G1 of the amplifier 12G will be controlled to A/n and the gain G2 of the amplifier 12K is controlled to (n−1)A/n.

In this configuration, when a video signal of level A is output from the VTR signal processing section 11 with the switch 12J off, the gain of the amplifier 12G is G1=1 and the gain of the amplifier 12K is G2=0 for the first field (n=1). The video signal output from the amplifier 12G is supplied to the adders 12H and 12I in sequence, while any signal is not output from the amplifier 12K and the average value of white noise is not supplied via the switch 12. This causes the level-A video signal to be stored in the memory section 13 via the A/D converter 12B.

For the second field (n=2), the gain of the amplifier 12G becomes G1=½ and that of the amplifier 12K becomes G2=½. Then, the level-A video signal output from the VTR signal processing section 11 is amplified to A/2 by the amplifier 12G and supplied to the adder 12H, to which the amplifier 12K-output video signal is also supplied. The video signal is obtained by reading it from the memory section 13 and amplifying it with the amplifier 12K. That is, the level A video signal read from the memory section 13 is amplified by the amplifier 12K to form the level A/2 video signal. Each level A/2 video signal from the amplifiers 12G and 12K is added at the adder 12H to produce the level-A video signal, which is in turn stored, via the adder 12I and the A/D converter 12B, in the memory section 13.

Figure 9:
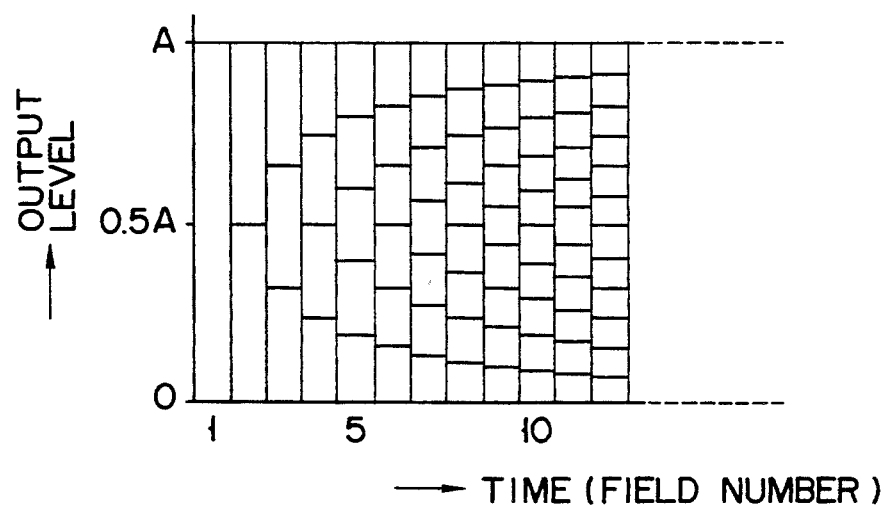
FIG. 9 illustrates how that the noise extracting section 12 of FIG. 8 operates as time elapses.

Similarly, the video signal output from the VTR signal processing section 11 is also processed. The results along the time axis is shown in FIG. 9. The output level is expressed by the following equation:

$$G1 + G2 = (A/n) + (n-1)A/n = A$$

As seen from the above equation, the output level is constant.

If the energy of the noise component contained in the video signal, which is considered a constant, is N, and the energy of the noise component contained in the nth field is Nn, the energy No of the noise component contained in the video signal after the process of the nth field is by the square-sum law as follows:

$$No = \sqrt{(N_1/n)^2 + (N_2/n)^2 + \ldots + (N_n/n)^2}$$
$$= N/\sqrt{n}$$

Thus, if n is infinite, the energy No of the noise component contained in the processed video signal is:

$$\lim_{n \to \infty} No = 0$$

When the process described above is performed for a specified number of fields, the periodic noise and the average value of white noise will be stored in the memory section 13. After this, when the switch 12J is turned on, the white-noise average value WN input via the switch 12J is subtracted from the periodic noise and the white-noise average value read from the memory section 13, at the adder 12I. This allows extraction of the periodic noise only. The extracted periodic noise is stored via the A/D converter 12B into the memory section 13.

Therefore, this embodiment allows more reliable extraction of periodic noises.

Figure 10:
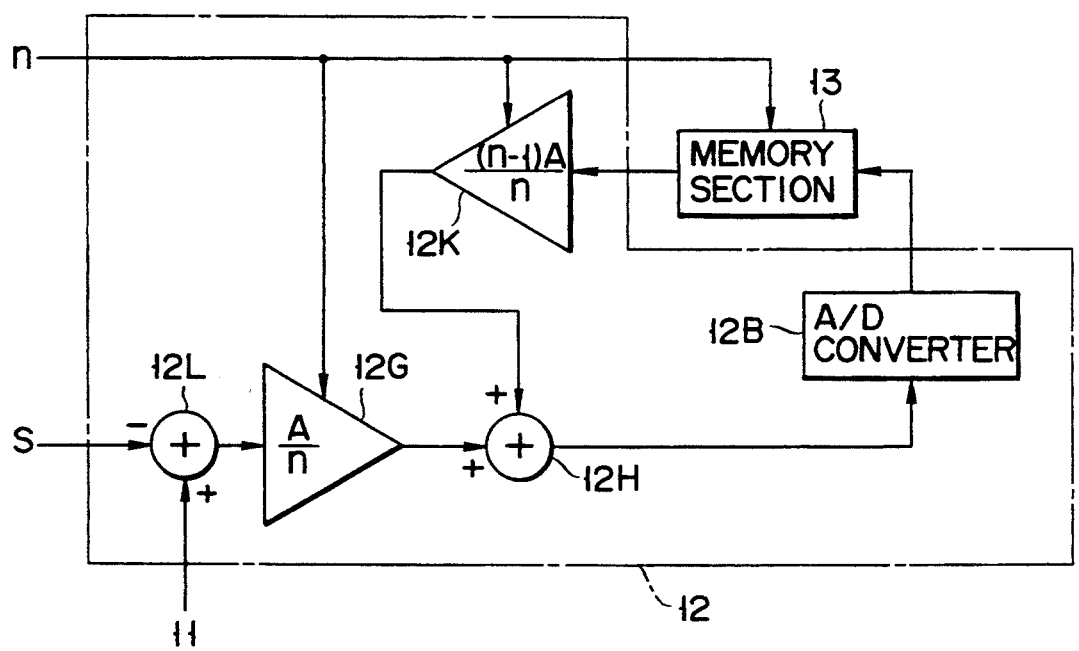
FIG. 10 is a block diagram for a fifth embodiment of the noise extracting section 12.

FIG. 10 illustrates a fifth embodiment of the noise extracting section 12. While in the embodiments described so far, a no-signal videotape is used to extract periodic noises, it may be possible to use a videotape containing a reference signal distinguishable from noise.

In FIG. 10 showing an embodiment that extracts periodic noises by using a reference signal-recorded videotape, the same parts as in FIG. 8 are indicated by the same symbols. In this embodiment, one input of the adder 12L is connected to the output of the VTR signal processing section 11 (not shown). The other input of the adder 12L is supplied with the same reference signal S as recorded on the videotape. The output of the adder 12H is connected to the memory section 13.

With this arrangement, the video signal containing the reference signal and periodic noise output from the VTR signal processing section 11 is supplied to the adder 12L, which subtracts the reference signal from the video signal. This reference signal-subtracted video signal is stored in the memory section 13 in the similar manner as described above. As a result, periodic noise is recorded in the memory section 13.

The present invention is not limited to VTR apparatus and may be applied to devices that produces periodic noises.

It is apparent that this invention may be practiced or embodied in still other ways without departing from the spirit or essential character thereof.

What is claimed is:

1. A noise reduction circuit for use in a video signal reproducing apparatus for eliminating cyclic noise components having a predetermined periodicity from an input video signal, said noise reduction circuit comprising:

noise extracting means, coupled to an output terminal of said reproducing apparatus via a switch, for extracting reference cyclic noise components having a predetermined periodicity from a noise signal which is reproduced by said reproducing apparatus from a non-recorded videotape, said switch being turned on when the non-recorded videotape is reproduced;

storing means coupled to said extracting means for storing the reference cyclic noise components extracted from the noise signal; and a subtracting means, coupled to said output terminal of said reproducing apparatus and said storing means, for subtracting the reference cyclic noise components read from said storing means from a video signal reproduced by said reproducing apparatus from a recorded videotape.

2. A video reproduction apparatus comprising:

a rotary head for reading and converting magnetic information stored on a videotape to electric signals, said electric signals including cyclic noise components having a predetermined periodicity generated by the rotary head;

a videotape recorder signal processing circuit having an input coupled to an output of said rotary head for converting said electric signals into a video signal; and a noise reduction circuit, said noise reduction circuit comprising:

a noise extracting circuit coupled to said videotape recorder signal processing circuit for extracting the cyclic noise components from the video signal;

a memory circuit coupled to said noise extracting circuit including a memory for storing the cyclic noise components extracted by said noise extracting circuit and means for reading the cyclic noise components from said memory in synchronization with a rotational period of the rotary head; and a subtracting circuit coupled to said memory circuit and said videotape recorder signal processing circuit for subtracting the cyclic noise components read from said memory circuit from said video signal.

3. A noise reduction circuit for eliminating cyclic noise components having a predetermined periodicity from an input signal, said noise reduction circuit comprising:

noise extracting means, having a first input terminal receiving the input signal, a second input terminal, a third input terminal receiving a white-noise average value, and an output terminal, for extracting cyclic noise components having a predetermined periodicity received at the second input terminal from the input signal received at said first input terminal, and for outputting the extracted cyclic noise components at said output terminal;

storing means, coupled to said second input terminal and said output terminal of said noise extracting means, for storing the cyclic noise components output at said output terminal, and for outputting the cyclic noise components to said second input terminal, wherein said noise extracting means includes:

first amplifying means, having an input coupled to said first input terminal, for amplifying the input signal, a gain of said first amplifying means set to a value A/n, where A is a level of the input signal, and n is a period of the input signal;

second amplifying means, having an input coupled to said second input terminal, for amplifying the cyclic noise components read from said storing means, a gain of said second amplifying means set to a value (n−1)A/n:

adding means, coupled to outputs of said first and second amplifying means, for adding output signals of said first and second amplifying means; and first subtracting means, coupled to said adding means, said third input terminal, and said output terminal, for subtracting the predetermined white-noise average value supplied at the third input terminal from an output of said adding means to extract the cyclic noise components, and for outputting the extracted cyclic noise components to said output terminal when the cyclic noise components stored in said storing means are updated; and second subtracting means, coupled to said storing means and said first input terminal of extracting means, for subtracting the cyclic noise components read from said storing means from the input signal.

4. The noise reduction circuit according to claim 3, wherein said memory circuit further comprises:

a writing circuit coupled to said input terminal and said memory for writing the cyclic noise components to said memory in synchronization with said input signal; and a digital-to-analog converter coupled to an output of said memory for converting the cyclic noise components stored in said memory from a digital format to an analog format.

5. The noise reduction circuit according to claim 3 wherein the input signal is a video signal.

6. A noise reduction circuit for eliminating cyclic noise components having a predetermined periodicity from an input signal, said noise reduction circuit comprising:

noise extracting means, having a first input terminal receiving the input signal, a second input terminal, a third input terminal, and an output terminal, for extracting cyclic noise components having a predetermined periodicity from the input signal received at said first input terminal, and for outputting the extracted cyclic noise components from said output terminal;

storing means coupled to said second input terminal and said output terminal of said noise extracting means, for storing the cyclic noise components output at said output terminal, and for outputting the cyclic noise components to said second input terminal, wherein said noise extracting means includes:

first adding means, coupled to said first input terminal and said third input terminal, for adding a reference signal supplied at said third input terminal and the input signal;

first amplifying means, having an input coupled to said first adding means, for amplifying an output signal output from said first adding means, a gain of said first amplifying means set to a value A/n, where A is a level of the input signal, and n is a period for the input signal;

second amplifying means, having an input coupled to said second input terminal, for amplifying the cyclic noise components read from said storing means, a gain of said second amplifying means set to a value (n−1)A/n;

second adding means, coupled to the outputs of said first and second amplifying means, for adding output signals of said first and second amplifying means, and for outputting the cyclic noise components to said output terminal, when the cyclic noise components stored in said storing means are updated; and subtracting means, coupled to said storing means and said first input terminal, for subtracting the cyclic noise components read from said storing means from the input signal.

7. A noise reduction apparatus for eliminating cyclic noises included in a video signal reproduced from a magnetic tape by a rotary head, said apparatus comprising:

a videotape recorder signal processing circuit having an input coupled to an output of said rotary head for converting electric signals into a video signal; and a noise reduction circuit comprising:

a noise extracting circuit coupled to said videotape recorder signal processing circuit for extracting cyclic noise components from the video signal;

a memory circuit coupled to said noise extracting circuit including a memory for storing the cyclic noise components extracted by said noise extracting circuit and means for reading the cyclic noise components from said memory in synchronization with a rotational period of the rotary head; and a subtracting circuit coupled to said memory circuit and said videotape recorder signal processing circuit for subtracting the cyclic noise components read from said memory circuit from said video signal.

* * * * *